United States Patent
Allen et al.

(10) Patent No.: US 8,485,475 B2
(45) Date of Patent: Jul. 16, 2013

(54) DEBRIS REMOVAL MANAGEMENT SYSTEM AND METHOD OF OPERATION THEREOF

(76) Inventors: Daniel W. Allen, Merritt Island, FL (US); Robert L. Spicer, Aldie, VA (US)

( * ) Notice: Subject to any disclaimer, the term of this patent is extended or adjusted under 35 U.S.C. 154(b) by 242 days.

(21) Appl. No.: 12/970,319

(22) Filed: Dec. 16, 2010

(65) Prior Publication Data

US 2011/0139936 A1 Jun. 16, 2011

Related U.S. Application Data

(60) Provisional application No. 61/287,059, filed on Dec. 16, 2009.

(51) Int. Cl.
*B64G 1/00* (2006.01)
*B64G 4/00* (2006.01)
*B64G 1/22* (2006.01)
*B64D 1/00* (2006.01)

(52) U.S. Cl.
USPC ............... 244/158.2; 244/158.1; 244/172.6; 244/171.5; 89/1.34

(58) Field of Classification Search
USPC .......... 244/158.2, 173.1, 173.3, 171.1, 159.5, 244/159.6, 159.4; 446/52, 56
See application file for complete search history.

(56) References Cited

U.S. PATENT DOCUMENTS

| | | | | |
|---|---|---|---|---|
| 4,356,662 | A * | 11/1982 | Strasser et al. | 446/52 |
| 4,798,143 | A * | 1/1989 | Graham | 102/370 |
| 5,743,492 | A * | 4/1998 | Chan et al. | 244/118.2 |
| 6,394,016 | B2 * | 5/2002 | Swartout et al. | 114/254 |
| 6,626,077 | B1 * | 9/2003 | Gilbert | 89/1.11 |
| 6,997,110 | B2 * | 2/2006 | Rastegar | 102/502 |
| 7,032,530 | B1 * | 4/2006 | Ansay et al. | 114/319 |
| 7,168,660 | B2 * | 1/2007 | Bischof et al. | 244/158.2 |
| 7,207,525 | B2 * | 4/2007 | Bischof et al. | 244/172.6 |
| 7,398,617 | B2 * | 7/2008 | Mattox | 43/58 |
| 2010/0193640 | A1 * | 8/2010 | Atmur et al. | 244/158.2 |

* cited by examiner

*Primary Examiner* — Rob Swiatek
*Assistant Examiner* — Marc Burgess

(57) ABSTRACT

A debris removal management system and a method of removing space debris. In one embodiment, the system includes: (1) a frame, (2) a plurality of net sections coupled to the frame and (3) a plurality of microvehicles coupled to the plurality of net sections and configured to be ejected relative to the frame to deploy the plurality of net sections, the plurality of net sections cooperating to form a net configured to capture space debris.

18 Claims, 19 Drawing Sheets

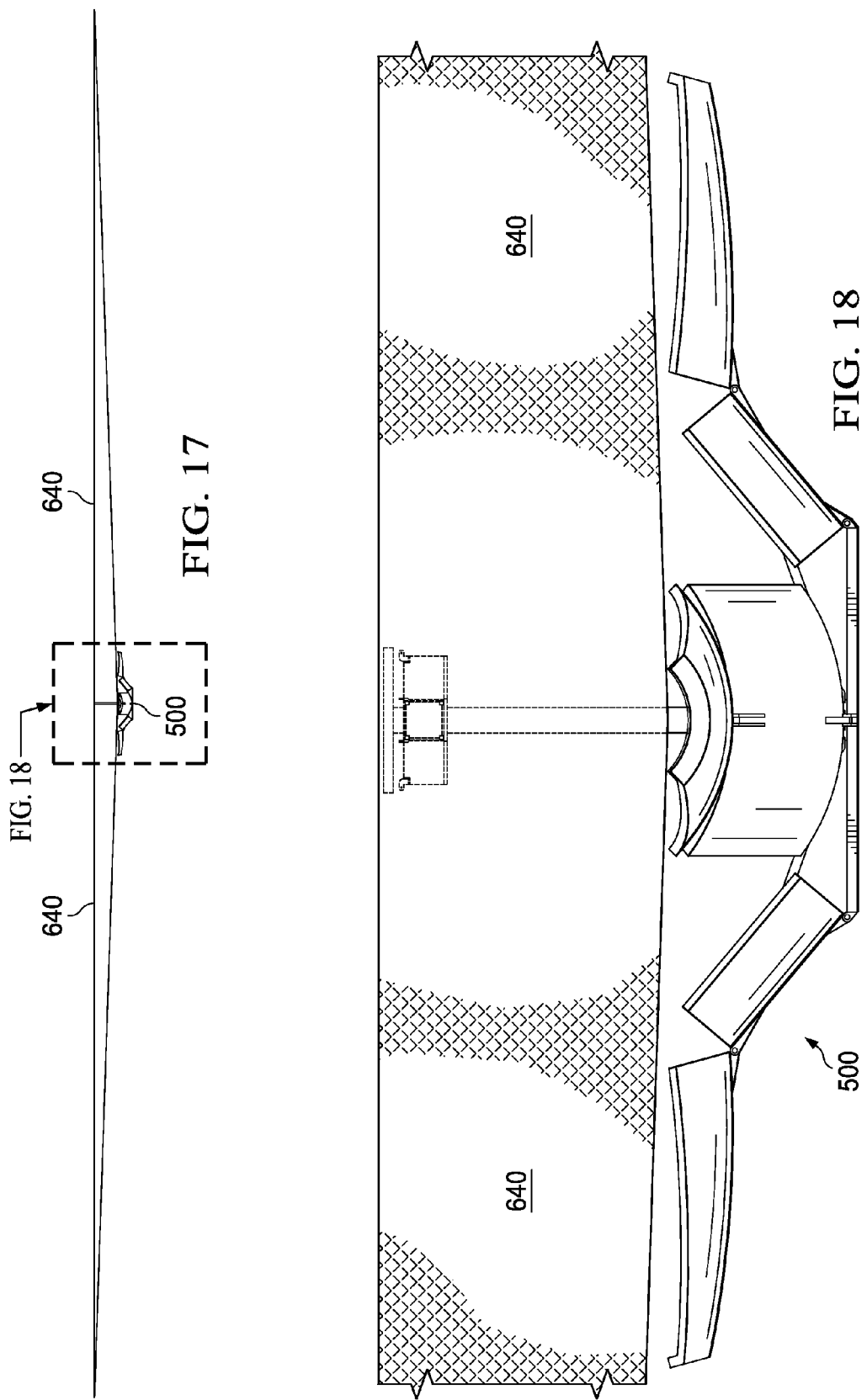

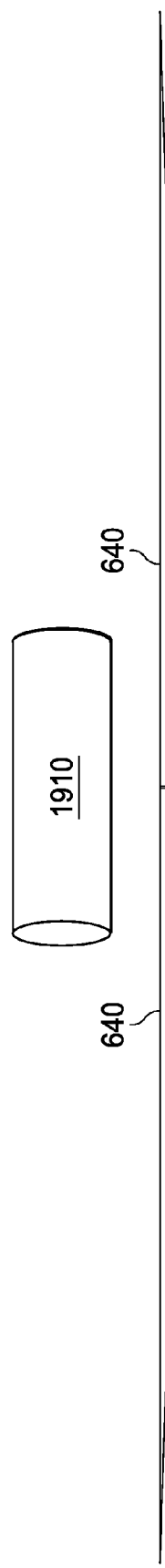
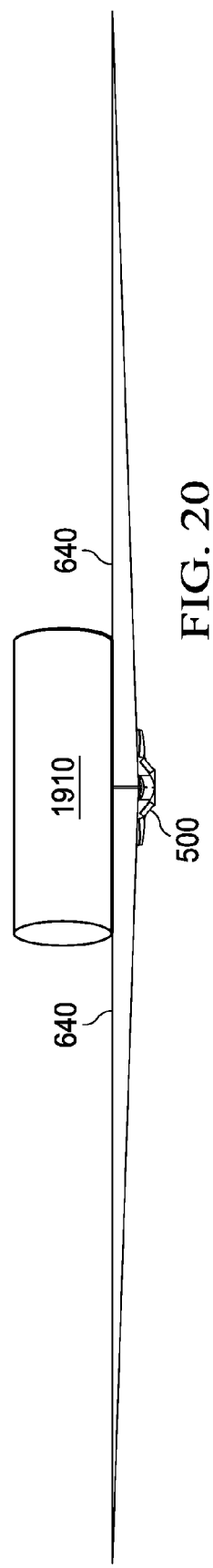

DEBRIS REMOVAL MANAGEMENT SYSTEM AND METHOD OF OPERATION THEREOF

CROSS-REFERENCE TO RELATED APPLICATION

This application claims the benefit of U.S. Provisional Application Ser. No. 61/287,059, filed by Allen, et al., on Dec. 16, 2009, entitled "Debris Removal Management System," commonly assigned with this application and incorporated herein by reference.

TECHNICAL FIELD

This application is directed, in general, to satellites and, more specifically, to satellites capable of at least intercepting space debris.

BACKGROUND

Space debris (also known as "orbital debris," "space junk" or "space waste") presents a serious collision risk for launch vehicles, orbital vehicles and satellites. Space debris can range in size from spent solid rocket motor cases to nuts, bolts and tiny bits of old launch vehicles to entire spent rocket stages and defunct satellites. However, the size of the debris is essentially irrelevant, since typical collision speeds are on the order of a few to tens of kilometers per second. At those speeds, even tiny debris can punch into functioning vehicles and satellites, sometimes breaching their skin, crippling their electronics and compromising their missions.

The problem of space debris has only become worse over the decades. While the orbits of space debris do eventually decay, and old space debris reenters the Earth's atmosphere and is destroyed, far more debris is added each year through new vehicle launches and satellite failures than is removed through reentry.

The conventional response to the problem of space debris has consisted of avoiding the creation of further space debris, using sacrificial layers of protection (e.g., foil) to protect sensitive equipment, altogether steering clear of known space debris and relying on orbital decay to remove space debris. Unfortunately, foil and extra fuel add weight and complexity to space structures and do not guarantee protection, especially from larger debris; much of the smaller space debris is undetectable and so cannot be avoided; and orbital decay takes an unreasonable amount of time (sometimes decades) to happen. Consequently, space debris remains a serious threat to further space exploration and exploitation.

SUMMARY

One aspect provides a DRMS. In one embodiment, the system includes: (1) a frame, (2) a plurality of net sections coupled to the frame and (3) a plurality of microvehicles coupled to the plurality of net sections and configured to be ejected relative to the frame to deploy the plurality of net sections, the plurality of net sections cooperating to form a net configured to capture space debris.

In another embodiment, the DRMS includes: (1) a frame including a base and a support member, (2) a plurality of net sections coupled to the frame, (3) a plurality of microvehicle housings coupled to the support member and having propulsion units, (4) a plurality of microvehicles coupled to the plurality of net sections and configured to be ejected relative to the frame to deploy the plurality of net sections using the propulsion units, the plurality of net sections cooperating to form a net configured to capture space debris and (5) an enclosure fairing hingedly coupled to the base.

Another aspect provides a method of removing space debris. In one embodiment, the method includes: (1) causing a plurality of microvehicles to be ejected relative to a frame of a DRMS, the plurality of microvehicles being tethered to a plurality of net sections, (2) consequently causing the plurality of net sections to be deployed, the plurality of net sections cooperating to form a net configured to capture space debris and (3) intercepting the space debris.

BRIEF DESCRIPTION

Reference is now made to the following descriptions taken in conjunction with the accompanying drawings, in which:

FIG. 17 is an elevational view of the DRMS of FIG. 5 showing the net thereof in the fully deployed state;

FIG. 18 is a portion of the elevational view of the DRMS of FIG. 5 showing the net thereof in the fully deployed state;

FIG. 19 is an elevational view of the DRMS of FIG. 18 approaching an example of a piece of space debris, namely a spent upper stage of a launch vehicle;

FIG. 20 is an elevational view of the DRMS of FIG. 18 coming into contact with the piece of space debris.

DETAILED DESCRIPTION

As stated above, space debris remains a serious threat to further space exploration and exploitation. Introduced herein are various embodiments of a DRMS configured to encounter space debris. Some embodiments of the DRMS are configured further to collect and move the space debris to another location that is regarded as being safe. That location may be in a new but safer orbit, or the DRMS may reenter with such collected debris as mission objectives may determine.

Mission and mission objectives often depend on object size and the velocity of the debris relative to that of the DRMS ("delta velocity"). One mission involves small debris having a high delta velocity (e.g., in excess of 7 km/sec). In such mission, the objective is not to try to collect the debris, but instead to slow the debris' velocity such that its orbit is degraded at an accelerated rate, and the risk of collision is reduced. Another mission involves small debris having a low delta velocity (e.g., less than 2 km/sec) and small and large debris having very low delta velocities (e.g., less than 10 m/sec). In such mission, the objective is to capture the debris and perhaps remove it to another location (including causing the DRMS to reenter with it. Yet another mission involves a single piece of very large debris (e.g., a defunct satellite or an expended launch vehicle) having a very low delta velocity. In such mission, the objective is to capture the debris and perhaps remove it. However, the objective may involve adapting the structure of the DRMS to the size and configuration of the debris, all the better to capture it reliably.

Various embodiments of the DRMS have various standardized launch vehicle interfaces, allowing the DRMS to be launched on different rocket launch vehicle types and sizes, as well as allowing the DRMS to be launched as an auxiliary payload ("rideshare"). Another embodiment of the DRMS may be launched solo as a primary launch payload or launched as a rideshare with other payloads on a launch of opportunity. In other embodiments, multiple DRMSs are located on a support or host satellite and configured to be deployed on demand as the host satellite is in orbit.

Figure 1:
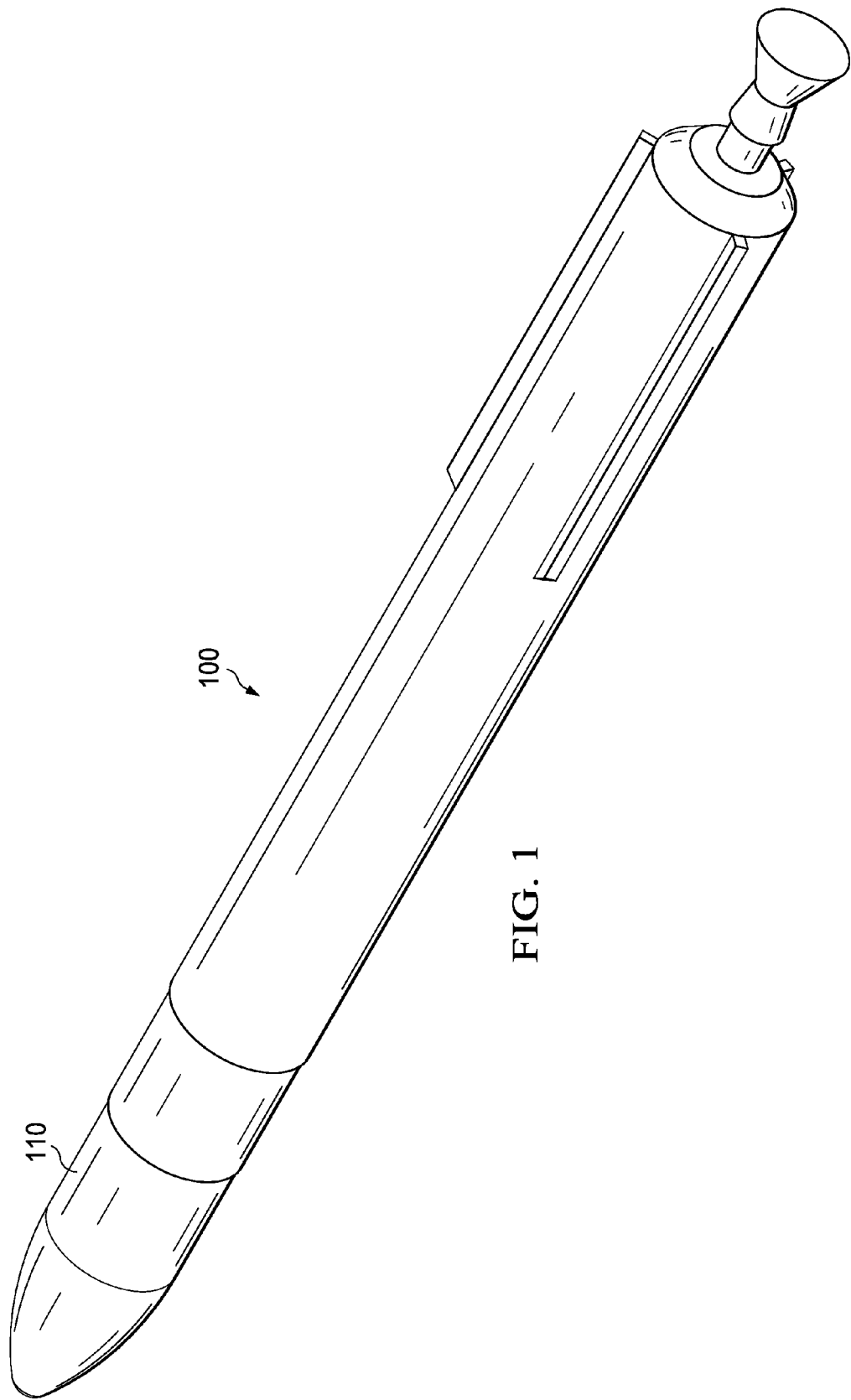
FIG. 1 is an elevational view of a launch vehicle that may be employed to transport various embodiments of a DRMS.

FIG. 1 is an elevational view of a launch vehicle 100 that may be employed to transport various embodiments of a DRMS. The launch vehicle 100 has a payload fairing (PLF) 110 within which various payloads may be carried into space. In the illustrated embodiment, the launch vehicle 100 carries at least one DRMS (not shown) within its PLF 110. The specific launch vehicle 100 illustrated in FIG. 1 is a Falcon 1e, which is commercially available from Space Exploration Technologies Corporation of Hawthorne, Calif. However, those skilled in the pertinent art should understand that any conventional or later-developed launch vehicle capable of carrying the DRMS into space may be employed in lieu of a Falcon 1e.

Figure 2:
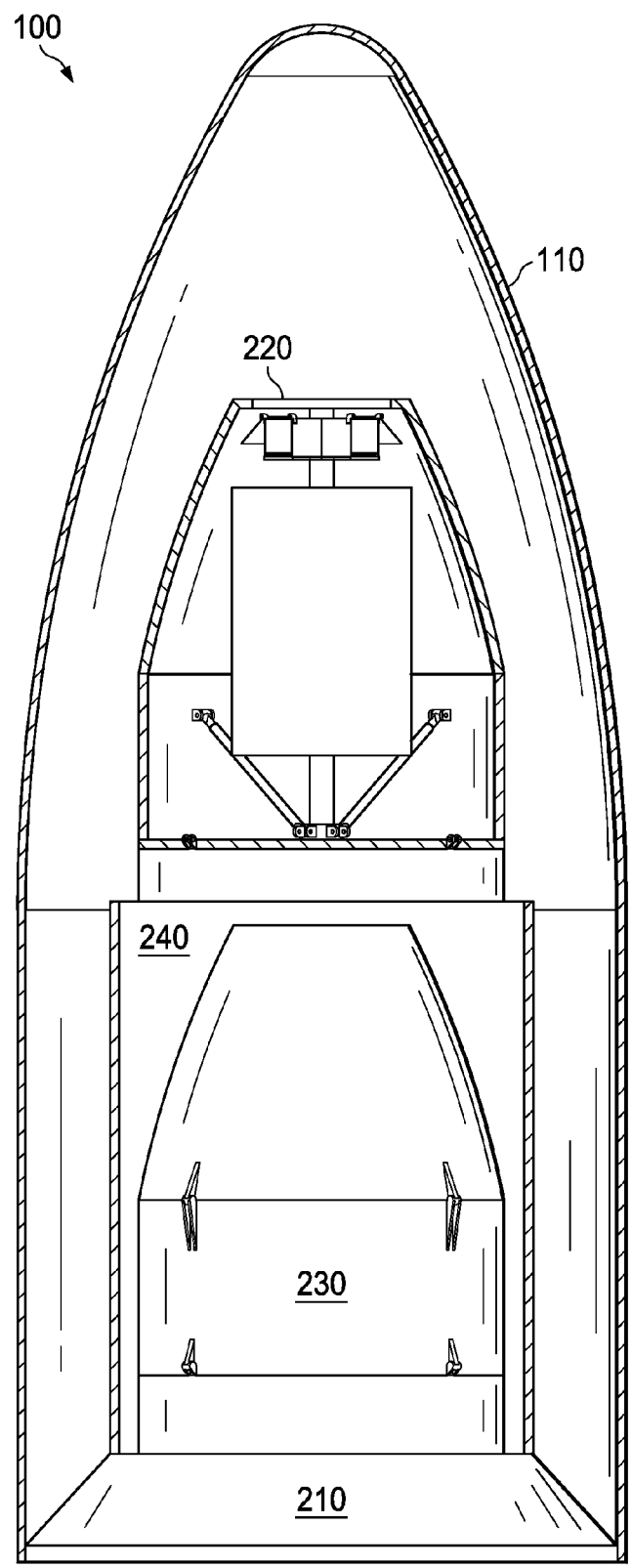
FIG. 2 is a cutaway view of a portion of a payload fairing of FIG. 1 containing, in particular, a launch vehicle adapter that, in turn, supports and ultimately dispenses, a stack of two DRMSs.

FIG. 2 is a cutaway view of a portion of the PLF 110 of FIG. 1 containing, in particular, a launch vehicle adapter 210 that, in turn, supports and ultimately dispenses, a stack of two DRMSs 220, 230. FIG. 2 shows the DRMSs 220, 230 as they may be configured during launch and initial flight of the launch vehicle 100.

In the embodiment of FIG. 2, the DRMS 220 (a "first DRMS") and the DRMS 230 (a "second DRMS") are stacked in a generally vertical arrangement. A dual payload adapter 240 is associated with the launch vehicle adapter 210 and configured to allow the launch vehicle adapter 210 to support the first DRMS 220 directly and without having to employ the second DRMS 230 to support the first DRMS 220. In the illustrated embodiment, the dual payload adapter 240 is generally cylindrical and surrounds the second DRMS 230. As will be illustrated below, the dual payload adapter 240 is configured to be used only to effect release of the first DRMS 220. Alternative embodiments of the dual payload adapter 240 may be employed in other phases of a mission. Alternative embodiments of the launch vehicle adapter 210 are configured to support more than two DRMSs, some in stacked configurations, some in tandem configurations.

In the illustrated and other, alternative embodiments, a "mother ship" (not shown) is configured to support multiple DRMSs. Various embodiments of such mother ship have a larger propulsion bus, an RCS, an EPS, a data bus system and various systems needed to navigate through space. As with the launch vehicle adapter 210 described above, one embodiment of the mother ship is attached to the launch vehicle with a suitable bus-to-launch vehicle interstage adapter interface. In various embodiments, the mother ship has one or more of navigation equipment, data links, EPS, Command, Control and Telemetry (CC&T) and antennas for satellite/ground communications and other equipment. In this configuration, DRMSs could remain dormant until mission requirements dictate deployment and execution of debris management.

Figure 3:
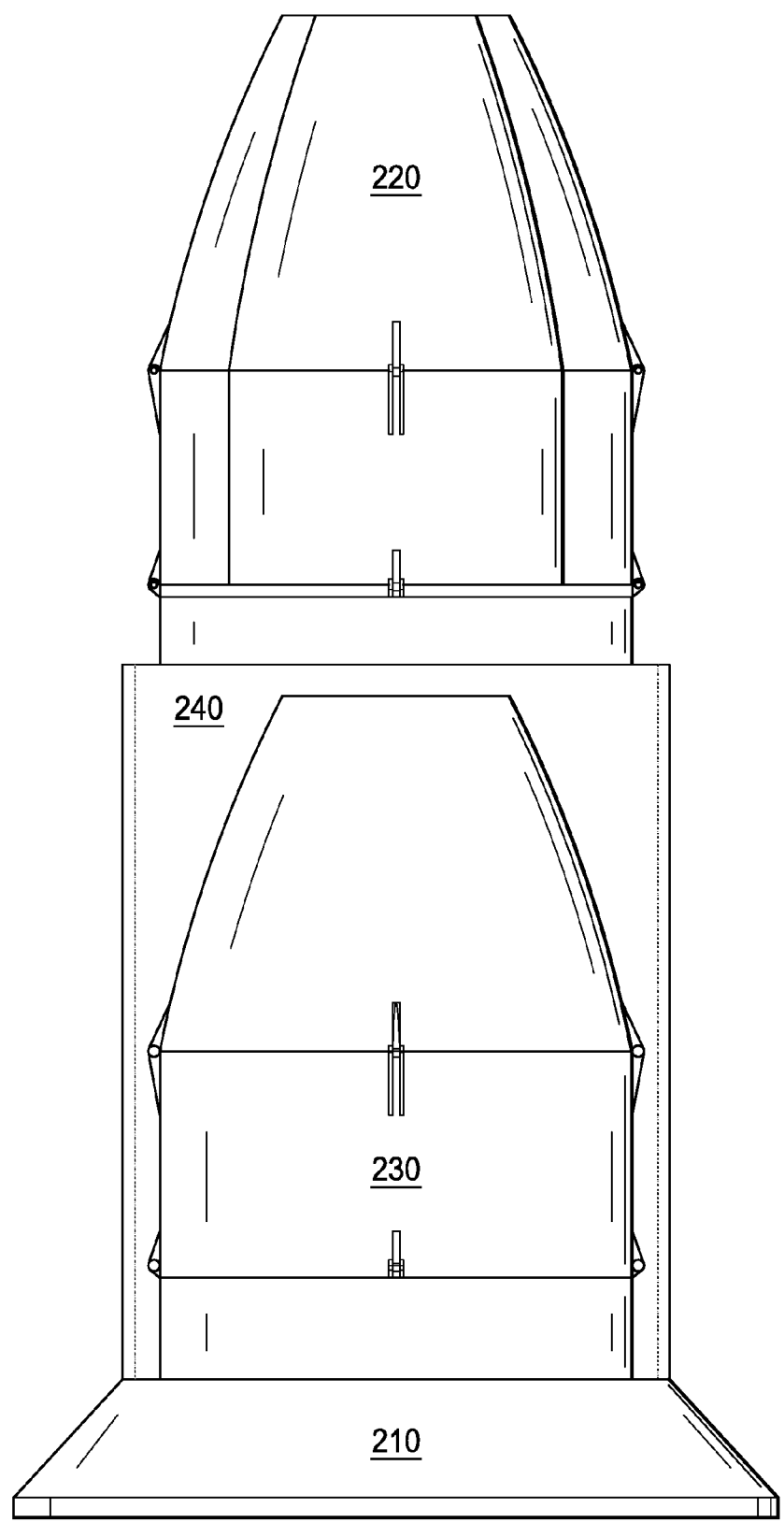
FIG. 3 is an elevational view of the launch vehicle adapter and stack of two DRMSs of FIG. 2 showing in greater detail a dual payload adapter associated with the launch vehicle adapter.

FIG. 3 is an elevational view of the launch vehicle adapter and stack of two DRMSs 220, 230 of FIG. 2 showing in greater detail the dual payload adapter 240 associated with the launch vehicle adapter 210. FIG. 3 shows the DRMSs 220, 230 after the PLF 110 has been ejected but before either DRMS 220, 230 has been released.

Figure 4:
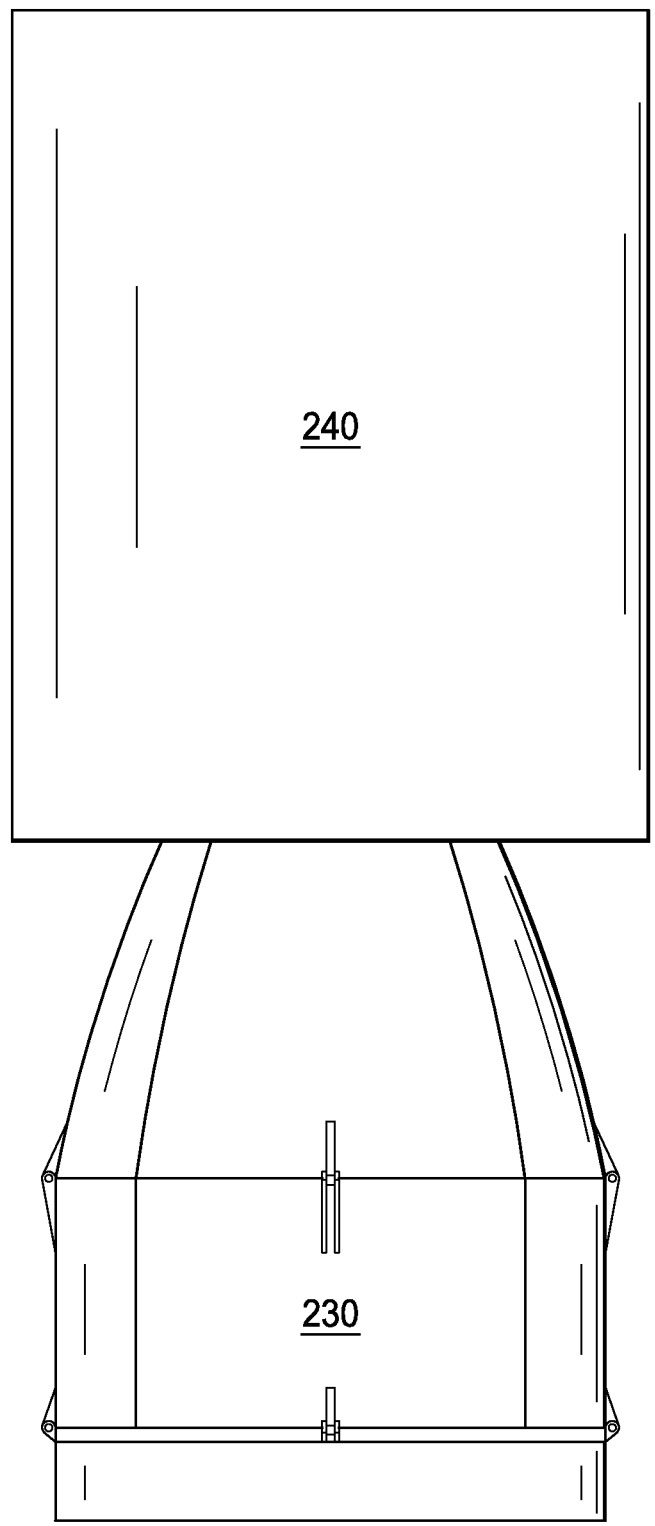
FIG. 4 is an elevational view of one of the stack of two DRMSs of FIG. 3 following a release of one of the stack of two DRMSs and showing a release of the dual payload adapter.

FIG. 4 is an elevational view of one of the stack of two DRMSs 220, 230 of FIGS. 2 and 3 following release of the first DRMS 220 of FIGS. 2 and 3) and during release of the dual payload adapter 240. More specifically, FIG. 4 shows only the second DRMS 230, and the dual payload adapter 240 is being jettisoned upwardly as shown. In the illustrated embodiment, the dual payload adapter 240 clears the second DRMS 230 before the second DRMS 230 is released. In one embodiment, the dual payload adapter 240 is tethered to the launch vehicle adapter 210 of FIGS. 2 and 3 to prevent it from becoming another piece of space debris. Those skilled in the pertinent art should understand that other ways exist to carry one or more DRMSs on a single launch vehicle and that the broad scope of the invention is not limited to the particular embodiments illustrated and described.

Figure 5:
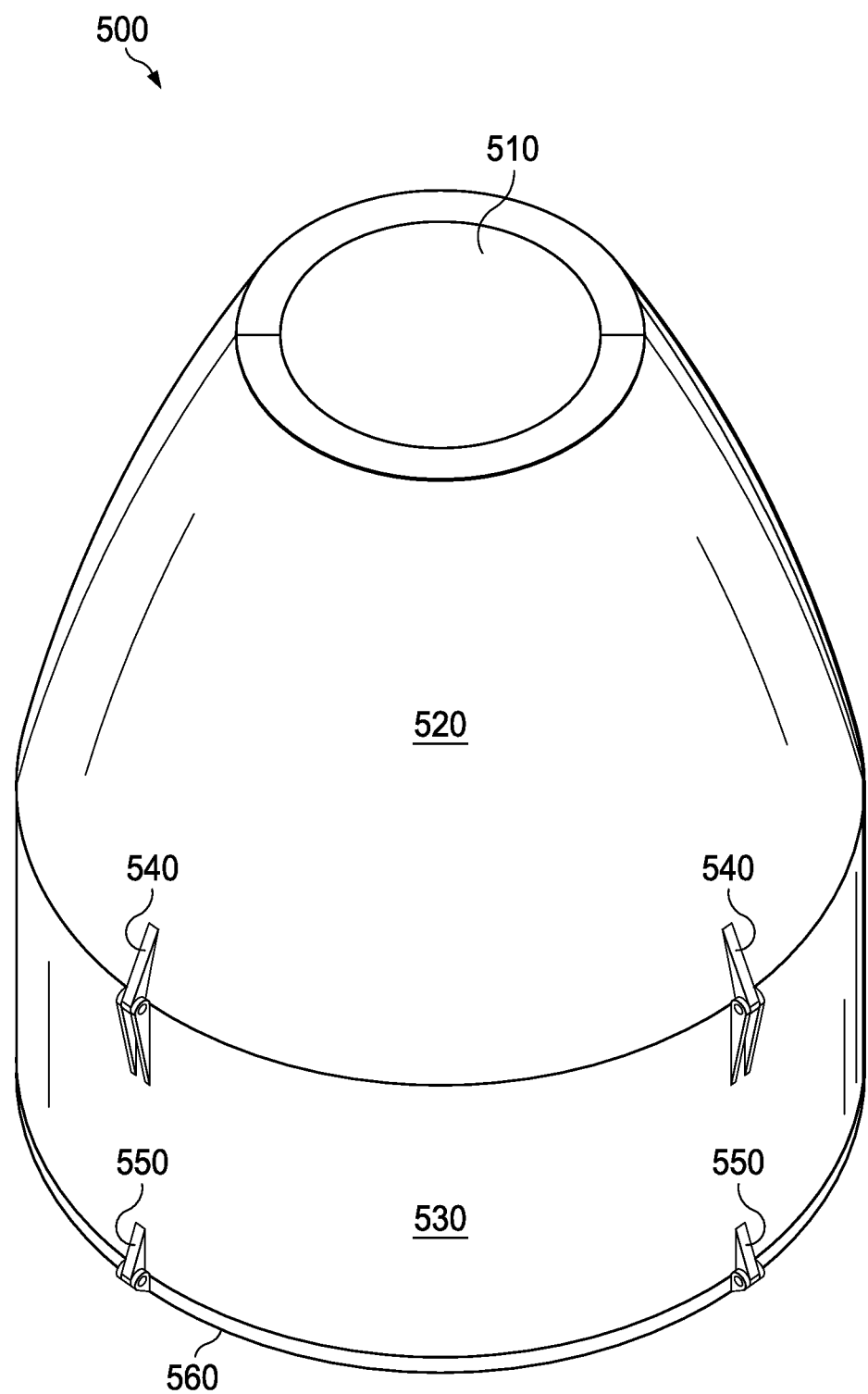
FIG. 5 is an isometric view of one embodiment of a DRMS constructed according to the principles of the invention showing the DRMS in a fully closed state.

FIG. 5 is an isometric view of one embodiment of a DRMS 500 constructed according to the principles of the invention showing the DRMS 500 in a fully closed state.

The DRMS 500 of FIG. 5 has a cap 510, an upper enclosure fairing 520 and a lower enclosure fairing 530. A first set of hinges 540 couples the upper enclosure fairing 520 to the lower enclosure fairing 530. A second set of hinges 550 couples the lower enclosure fairing 530 to a base 560. In the illustrated embodiment, the upper and lower enclosure fairings 520, 530 serve to protect internal portions of the DRMS 500 from damage during ground processing and while in space and further offer protection from ultraviolet (UV) radiation while orbiting. As will be seen in subsequent FIGS. 6-20, the upper and lower enclosure fairings 520, 530 are divided into sections, allowing them to be peeled outward much as the skin is peeled from a banana. Thus peeled, portions of the DRMS 500 that are housed inside the upper and lower enclosure fairings 520, 530 are exposed and allowed to function.

As described above, the DRMS 500 is typically deployed in conjunction with a main bus, a propulsion bus or a support/host satellite (not shown). The propulsion bus or support/host satellite may be of any suitable conventional or later-developed type and will not be further described in FIG. 6, et seq., because it operates largely independently of the DRMS 500. Its general function is to transport the DRMS 500 to a desired location and perhaps thereafter to assist the DRMS 500, along with any space debris it may have collected, to another location.

In one embodiment, the DRMS 500 includes a robotic arm (not shown). In one specific embodiment, the cap 510 supports the robotic arm. In alternative embodiments, other parts of the DRMS 500 support the robotic arm. The robotic arm, if included in a particular embodiment, is configured to grasp other objects, e.g., an errant satellite, a piece of debris, a launch vehicle adapter or a launch vehicle.

In one embodiment, the main bus is a commercial off-the-shelf (COTS) propulsion bus having its own propulsion system, reaction control system (RCS), electrical power system (EPS) and data bus system. In addition to these, the main bus typically includes a mechanical and electrical interface to the DRMS 500, allowing it to move the DRMS 500 about and communicate and coordinate with it. In the illustrated embodiment, the main bus is attached to the DRMS 500 at one end (e.g., the base 560). In a related embodiment, the main bus is attached to the launch vehicle with a suitable main bus-to-launch vehicle interstage adapter interface at the other end.

Figure 6:
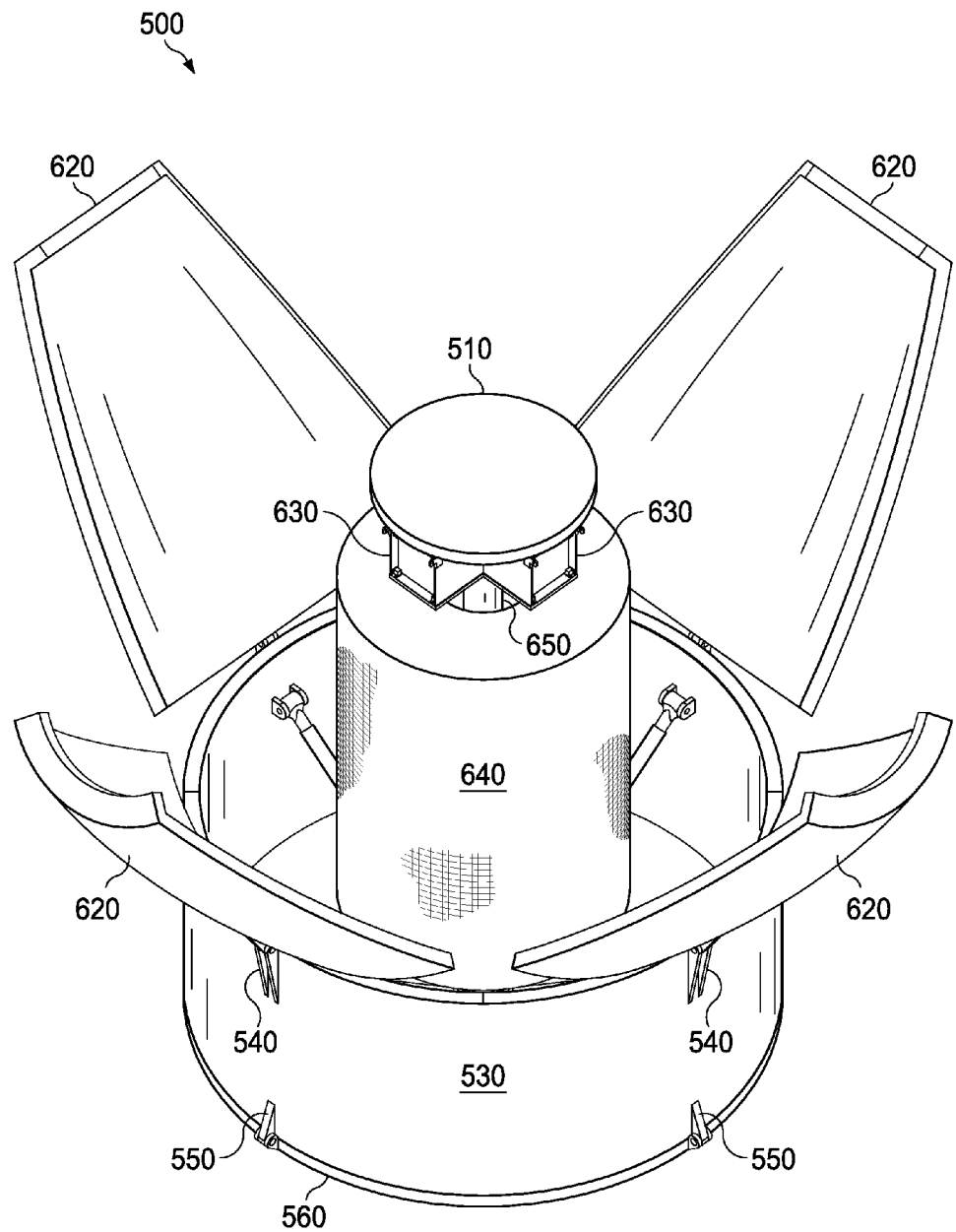
FIG. 6 is an isometric view of the DRMS of FIG. 5 showing the DRMS in a partially open state.

FIG. 6 is an isometric view of the DRMS 500 of FIG. 5 showing the DRMS 500 in a partially open state. Shown are the cap 510 and the lower enclosure fairing 530. The upper enclosure fairing is shown partially open and divided into a plurality of upper enclosure fairing sections 620 though larger embodiments may have additional sections 620 and 730. The specific embodiment of FIG. 6 has four such upper enclosure fairing sections 620. The first set of hinges (540 of FIG. 5) allow the four upper enclosure fairing sections 620 to rotate outwardly relative to the lower enclosure fairing 530 of FIG. 5. Now exposed, various portions of the DRMS 500 that were previously occluded become apparent.

FIG. 6 shows a plurality of microvehicle housings 630. The microvehicle housings 630 are configured to house microvehicles (not shown in FIG. 6, but shown and described in conjunction with subsequent FIGs.) The microvehicle housings 630 are shown without doors. In one embodiment, the microvehicle housings 630 lack doors. In the illustrated embodiment, however, the microvehicle housings 630 have doors. However, FIGS. 6-10 omit the doors for clarity's sake. FIGS. 11-14, described below, show one embodiment of the doors.

FIG. 6 also shows a corresponding plurality of net sections 640. In one embodiment, the plurality of net sections 640 are physically separate from one another. In an alternative embodiment, the plurality of net sections 640 are regions of the same net. In the specific embodiment of FIG. 6, the net sections 640 are stored as a generally cylindrical roll. In alternative embodiments, the net sections 640 are stored as multiple rolls. In further embodiments, the net sections 640 are stored as folded stacks. A support member 650 extends upwardly through a center of the net sections 640 as shown to support the plurality of microvehicle housings 630 and the cap 510. The support member 650, together with the base 560, form a frame of the DRMS 500.

Figure 7:
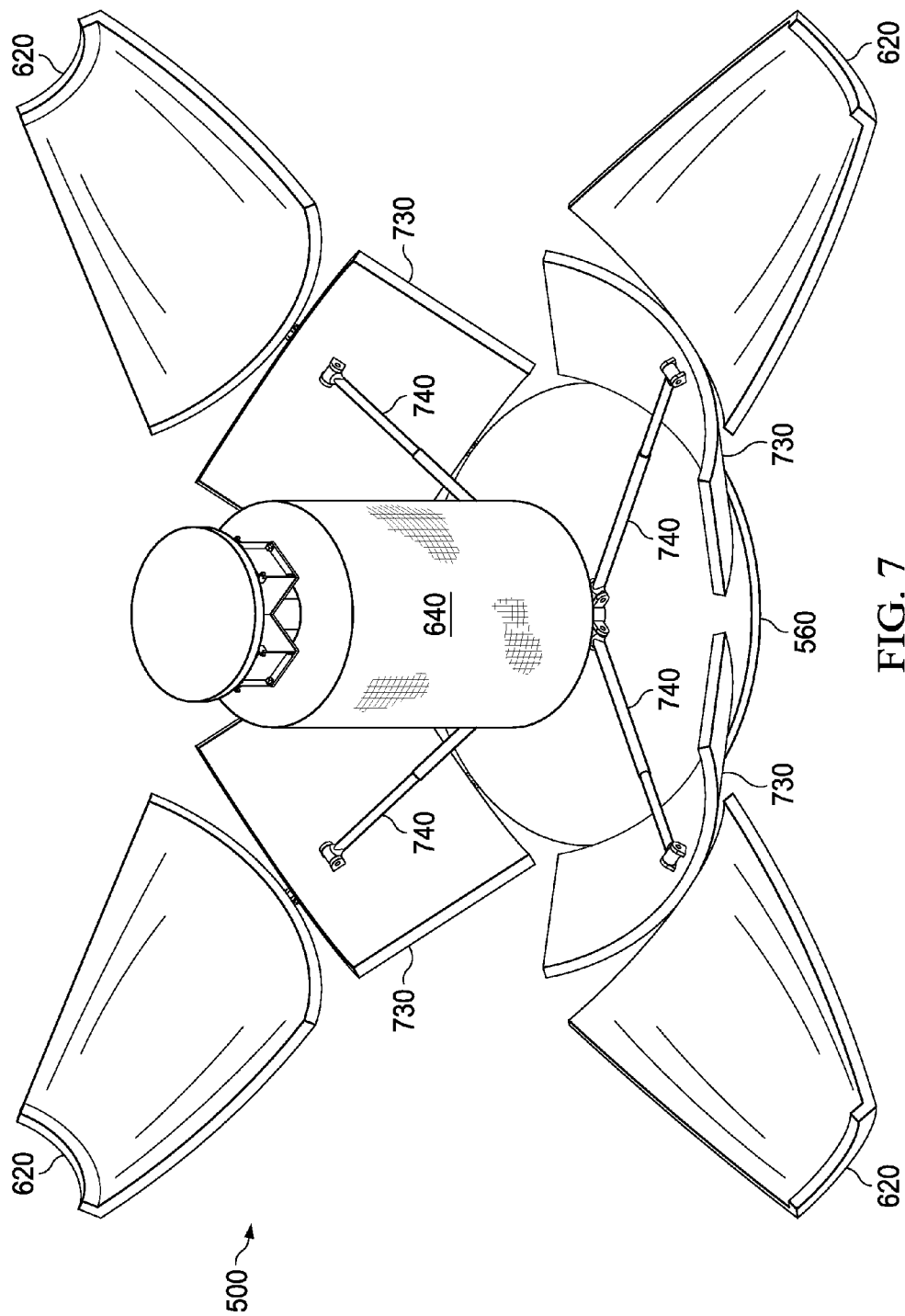
FIG. 7 is an isometric view of the DRMS of FIG. 5 showing the DRMS in a fully open state.

FIG. 7 is an isometric view of the DRMS 500 of FIG. 5 showing the DRMS in a fully open state. Both the upper and lower enclosure fairings of FIG. 5 are shown in their fully open state. As with the upper enclosure fairing of FIG. 6, the lower enclosure fairing of FIG. 7 is shown as being divided into a plurality of lower enclosure fairing sections 730. The specific embodiment of FIG. 7 has four such lower enclosure fairing sections 730. Just as the first set of hinges 540 of FIG. 5 allowed the upper enclosure fairing sections 620 to rotate outwardly relative to the lower enclosure fairing 530 of FIG. 5, the second set of hinges 550 of FIG. 5 allow the lower enclosure fairing sections 730 to rotate outwardly relative to the base 560. FIG. 7 shows a corresponding number of actuating arms 740 that urge the lower enclosure fairing sections 730 outwardly. Although FIG. 7 does not show them, a corresponding number of similar actuating arms are provided and configured to urge the upper enclosure fairing sections 620 to rotate outwardly. Alternative embodiments employ actuator motors in lieu of, or in addition to, the actuating arms 740 or the actuating arms for the upper enclosure fairing sections 620.

In the illustrated embodiment, the net sections 640 are rolled or folded to allow large sections of net to be stored and deployed easily. In various embodiments, the net sections 640 are made of a material that is selectable in terms of type to meet a specific mission requirement. In one embodiment, the net sections 640 are made of rip-stop material (e.g., Nylon®, commercially available from the E.I. du Pont de Nemours and Company of Wilmington, Del.) to provide resistance against ripping that may otherwise occur when debris penetrates the net. In another embodiment, the net sections 640 are made of a puncture-resilient material (e.g., Kevlar®, commercially available from the E.I. du Pont de Nemours and Company of Wilmington, Del.). In yet another embodiment, the net sections 640 are made of a non electromagnetic-radiation penetrating material or any combination of materials.

In various embodiments, the net sections 640 are made of a material that is selectable in terms of size and shape to meet a specific mission requirement. In various embodiments, the net sections 640 range in size from large (e.g., hundreds of square meters) to small (e.g., only tens of meters) as mission requirements dictate. In the illustrated embodiment, the net sections 640 are generally triangular, with a focal point at the support member 650 with the wide part of the material 640 on the outer edge of the deployed material, though the broad scope of the invention is not limited to a particular shape or number of shapes.

In various embodiments to be illustrated and described herein, the net sections are attached to the DRMS 500 at inner edges thereof (e.g., to the support member 650) and to at least one microvehicle at outer edges thereof. In the embodiment of FIG. 6, the net sections are attached to the DRMS 500 at inner edges thereof and four microvehicles (one microvehicle per section) at outer edges thereof.

Figure 8:
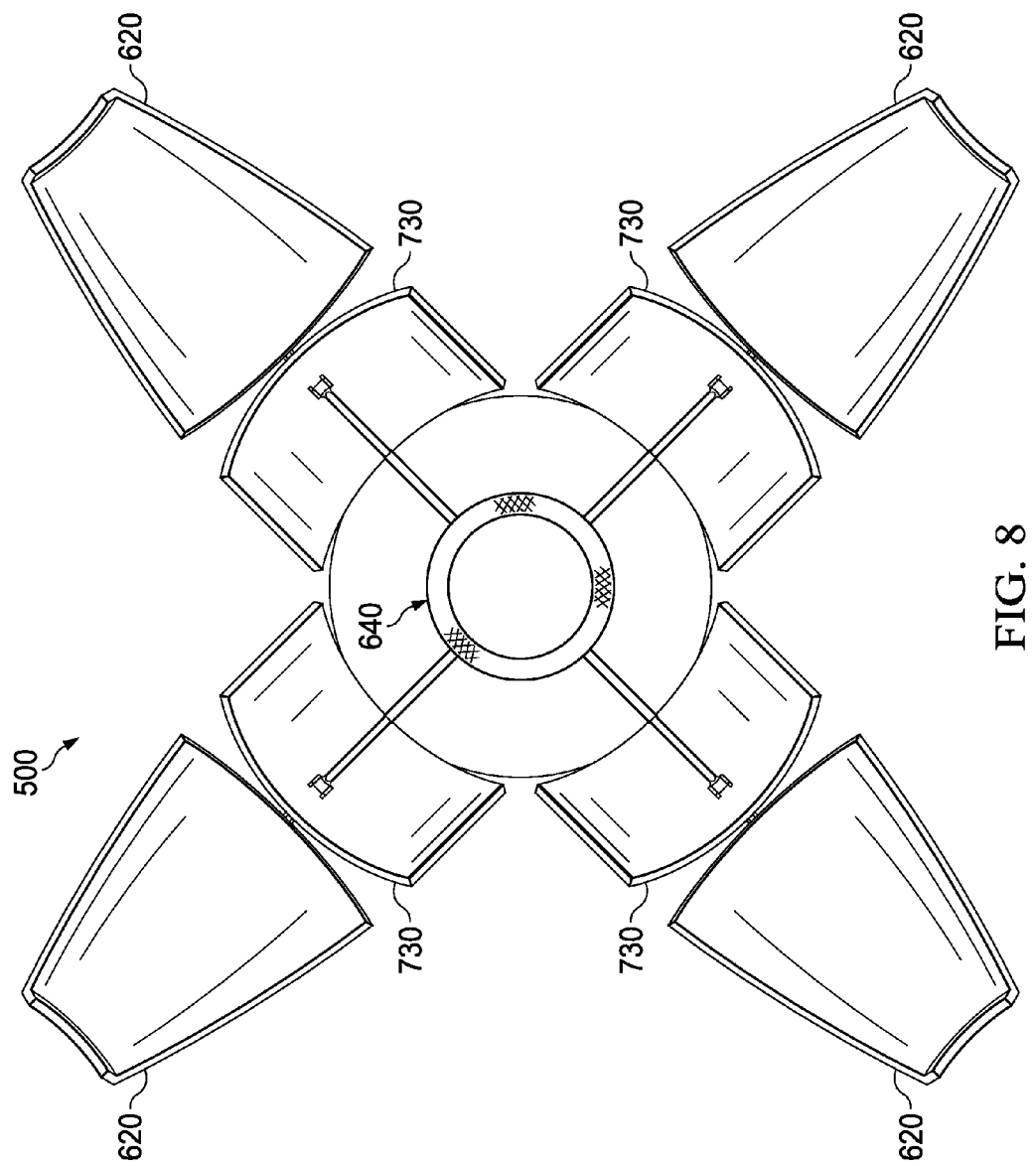
FIG. 8 is a plan view of the DRMS of FIG. 7 shown in the fully open state.

FIG. 8 is a plan view of the DRMS 500 of FIG. 7 shown in the fully open state. FIG. 8 is presented primarily for the purpose of illustrating how the upper and lower enclosure fairing sections 620, 730, the net sections 640 and the plurality of microvehicle housings 630 may be radially arranged with respect to one another when the DRMS 500 is in its fully open state. The configuration is such that a corresponding plurality of microvehicles (not shown in FIG. 8) can be ejected radially outwardly from the plurality of microvehicle housings (unreferenced in FIG. 8) and how the plurality of microvehicles can deploy the net sections 630 that lie "below" them.

Figure 9:
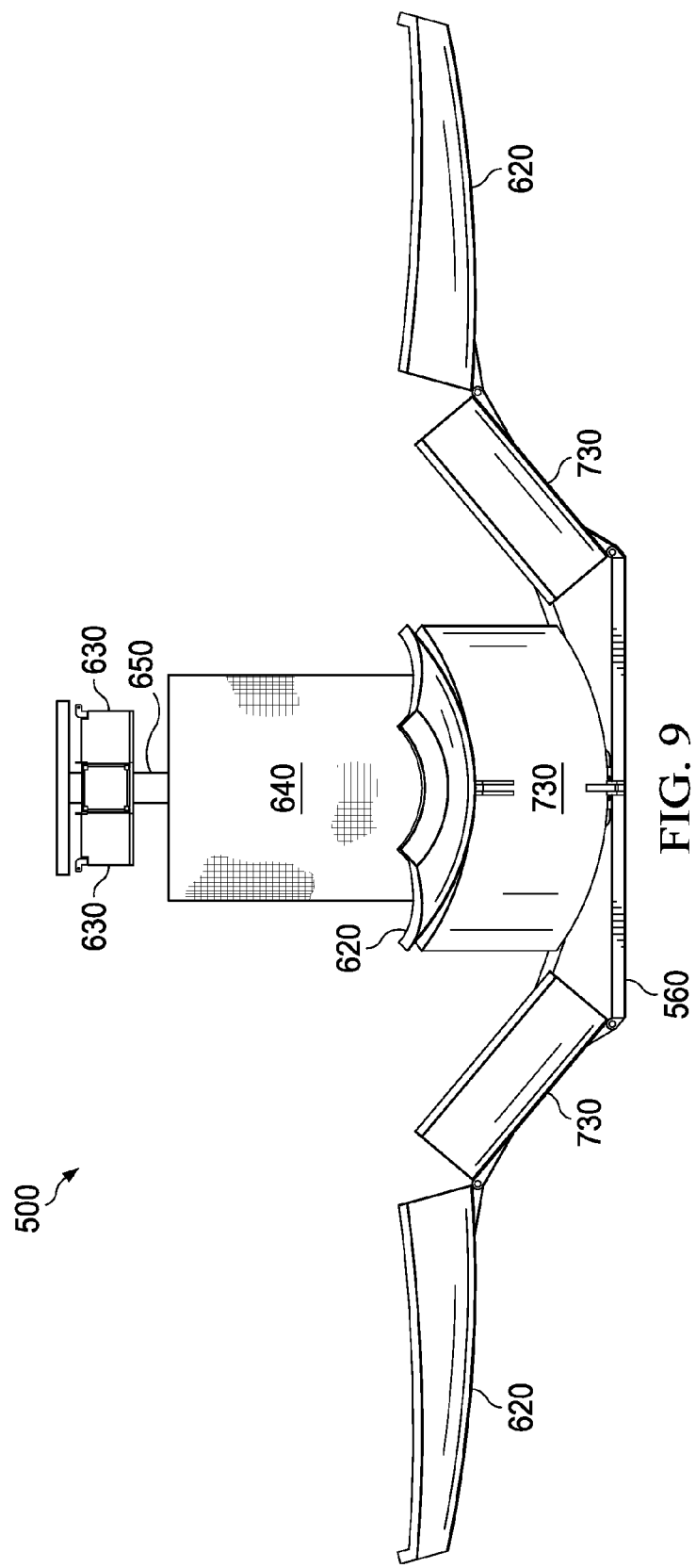
FIG. 9 is an elevational view of the DRMS of FIG. 7 shown in the fully open state.

FIG. 9 is an elevational view of the DRMS 500 of FIG. 7 shown in the fully open state. FIG. 9 is presented primarily for the purpose of illustrating one possible relative configuration among the upper and lower enclosure fairing sections 620, 730, the base 560, the net sections 640 and the plurality of microvehicle housings 630. The configuration is such that the plurality of microvehicle housings 630 can deploy the net sections 630 without interference from the upper and lower enclosure fairing sections 620, 730.

Figure 10:
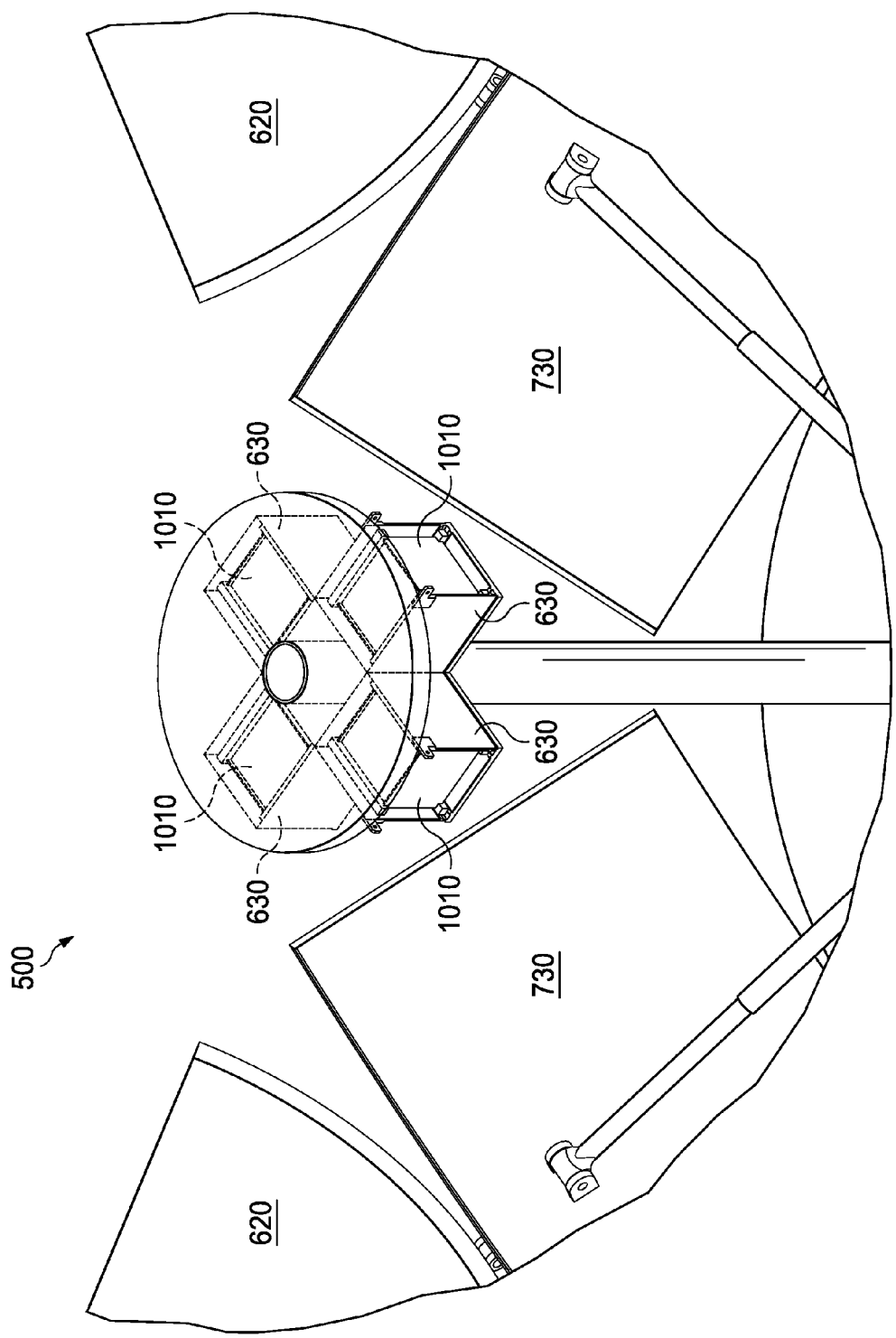
FIG. 10 is a portion of the isometric view of FIG. 7 showing in particular microvehicles located in respective microvehicle housings and configured to employ sections of a net.

FIG. 10 is a portion of the isometric view of FIG. 7 showing in particular a plurality of microvehicles 1010 located in their respective microvehicle housings 630 and configured to employ sections of a net (not shown in FIG. 10). It should be noted that the net sections 640 shown in FIG. 7 are omitted from FIG. 10.

In the illustrated embodiment, each microvehicle includes propulsion, RCS, EPS and data bus systems 1510. The microvehicles 1010 are configured to respond to a command from the DRMS 500 to eject and travel (e.g., linearly) to a location distal from the DRMS 500. In doing so, the microvehicles 1010 drag corresponding net sections behind them, deploying them. The microvehicles 1010 may later respond to one or more commands from the DRMS 500 to return to the DRMS 500 or converge with other microvehicles 1010 to close the net sections (tantamount to drawing the drawstring on a bag) and thereby retain any space debris that has been captured in the net sections. In the illustrated embodiment, the microvehicles 1010 are commercially available, e.g., from SpaceQuest, Ltd, of Fairfax, Va. Alternative embodiments employ conventional microvehicles that are commercially available from other manufacturers or later-developed microvehicles.

Figure 11:
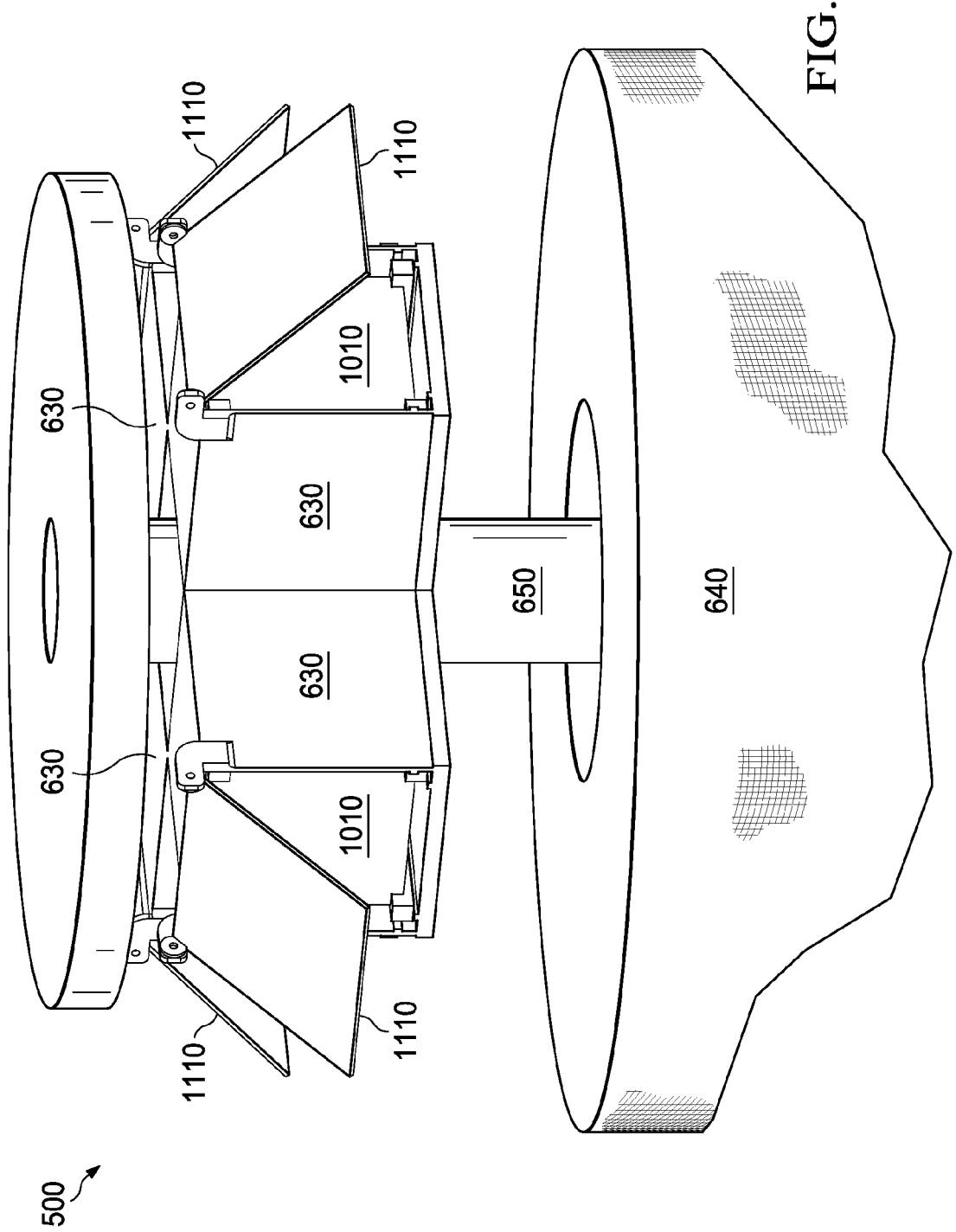
FIG. 11 is a portion of the isometric view of FIG. 7 showing doors of the microvehicle housings of FIG. 10 in an open state.

It should also be noted that FIG. 10, like the FIGs. before it, do not show the doors on the microvehicle housings 630 for the sake of clarity. One embodiment of such doors will now be illustrated and described. FIG. 11 is a portion of the isometric view of FIG. 7 showing doors 1110 of the microvehicle housings 630 of FIG. 10 in an open state. The illustrated embodiment of each door 1110 exists in a single piece, hinged on one side. In the embodiment of FIG. 11, the DRMS 500 is configured to command the doors 1110 to open as needed to allow the microvehicles 1010 to be ejected or protect the microvehicles 1010 from damage.

Figure 12:
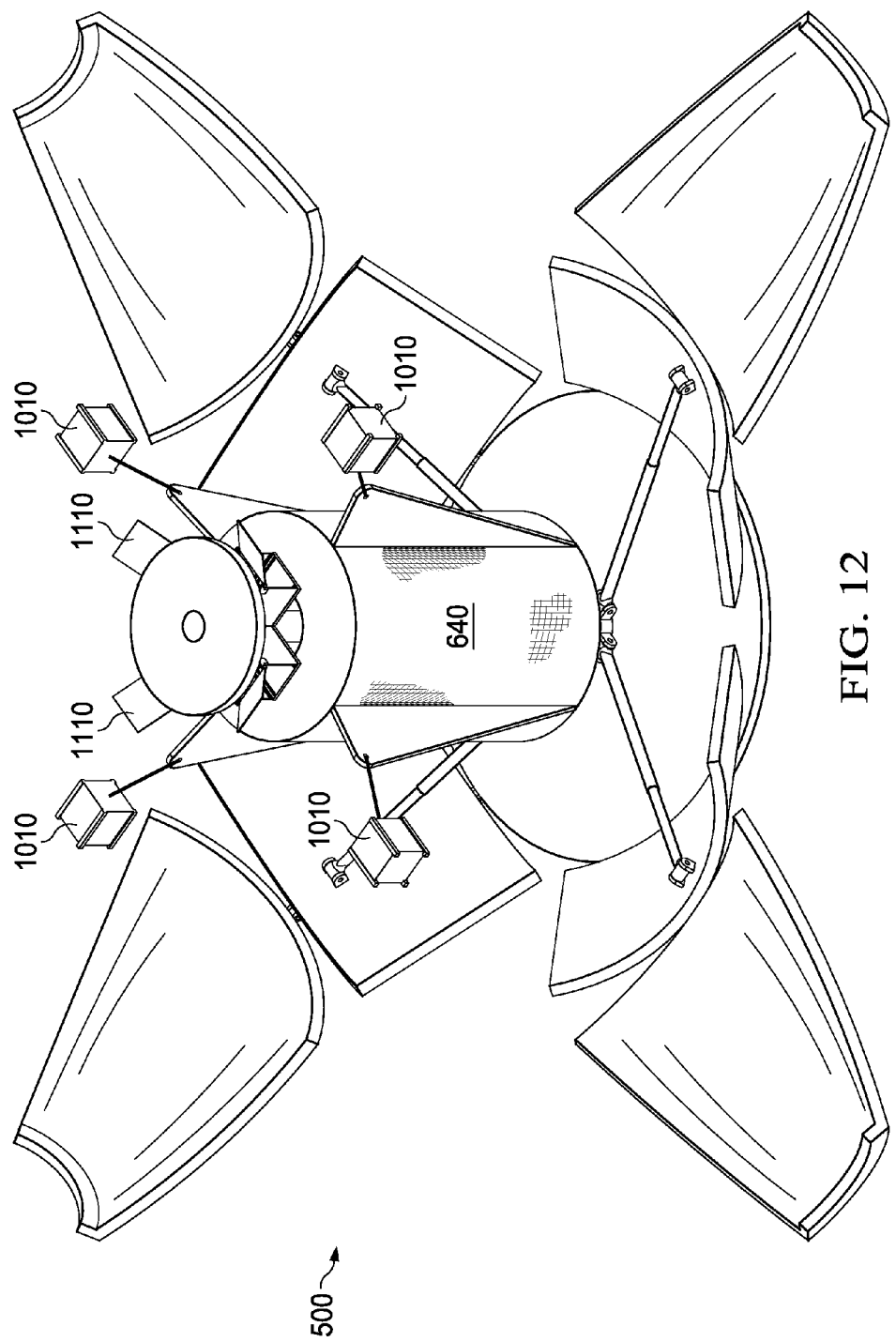
FIG. 12 is a portion of the isometric view of FIG. 7 showing the microvehicles ejecting from their respective microvehicle housings to deploy corresponding net sections.

FIG. 12 is a portion of the isometric view of FIG. 7 showing the microvehicles 1010 ejecting from their respective microvehicle housings 630 to deploy corresponding net sections. For clarity's sake, only one of the microvehicle housings 630 and doors 1110 is referenced in FIG. 12.

As is apparent, the microvehicles 1010 have been ejected from their microvehicle housings 630 and are traveling in a generally straight line directly radially outwardly from the microvehicle housings 630. In one embodiment, ejection of the microvehicles 1010 is carried out using potential energy stored in a spring located in each of the microvehicle housings 630. In the illustrated embodiment, ejection of the microvehicles 1010 is carried out using the propulsion systems in the microvehicles 1010. As is also apparent, each of the microvehicles 1010 is tethered to a leading edge portion (unreferenced) of a corresponding net section 640, as evidenced by the leading edge portion unfurling. A tether couples the microvehicles to their respective leading edge. FIG. 12 shows, but does not reference, the tethers for clarity's sake.

In various embodiments, the DRMS 500 directly controls the microvehicles 1010. In other embodiments, the microvehicles 1010 are semi- or fully autonomous. In certain embodiments, the microvehicles 1010 are scalable in terms of size and/or number per net section depending on the size of each net section to be deployed.

Figure 13:
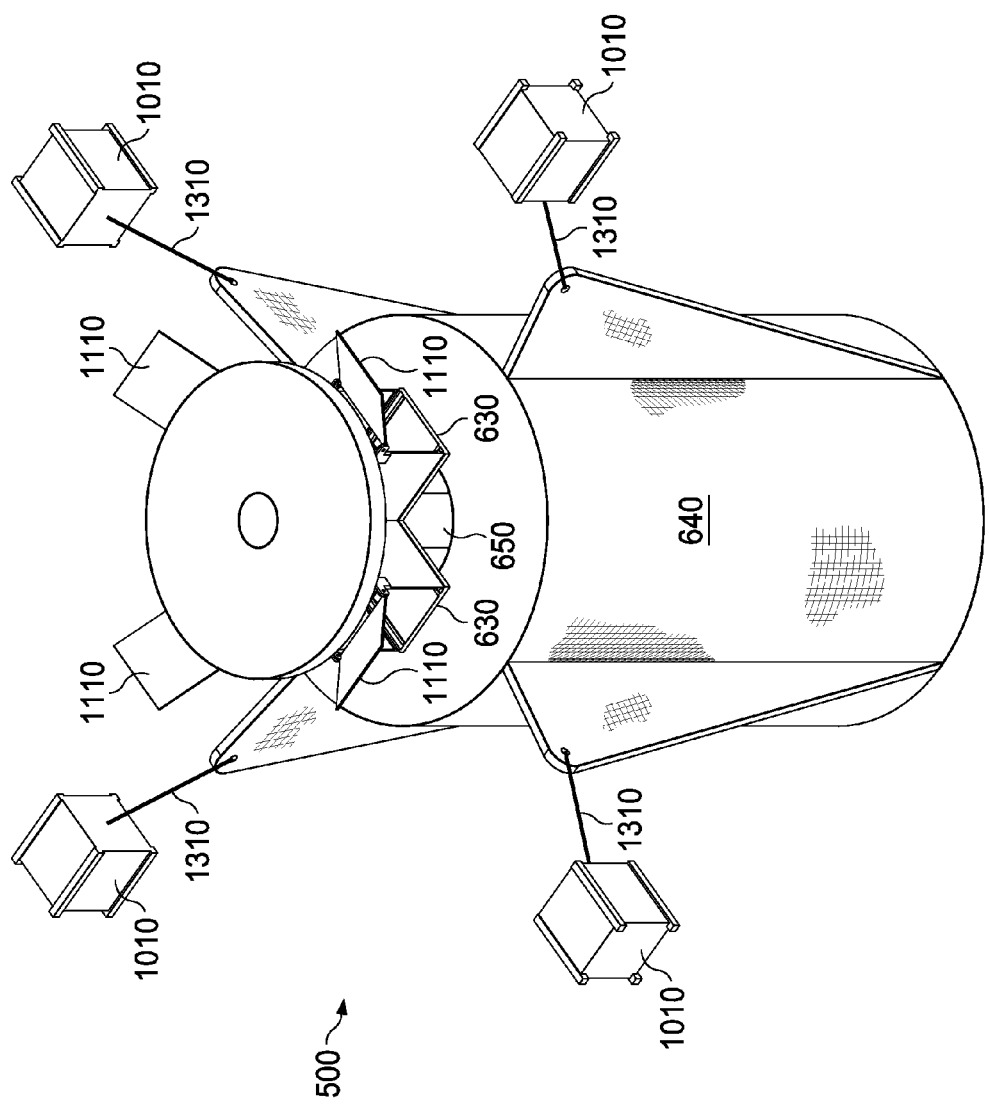
FIG. 13 is a further isometric view of a portion of the DRMS of FIG. 5 showing the microvehicles ejecting from their respective microvehicle housings to deploy corresponding net sections.
Figure 14:
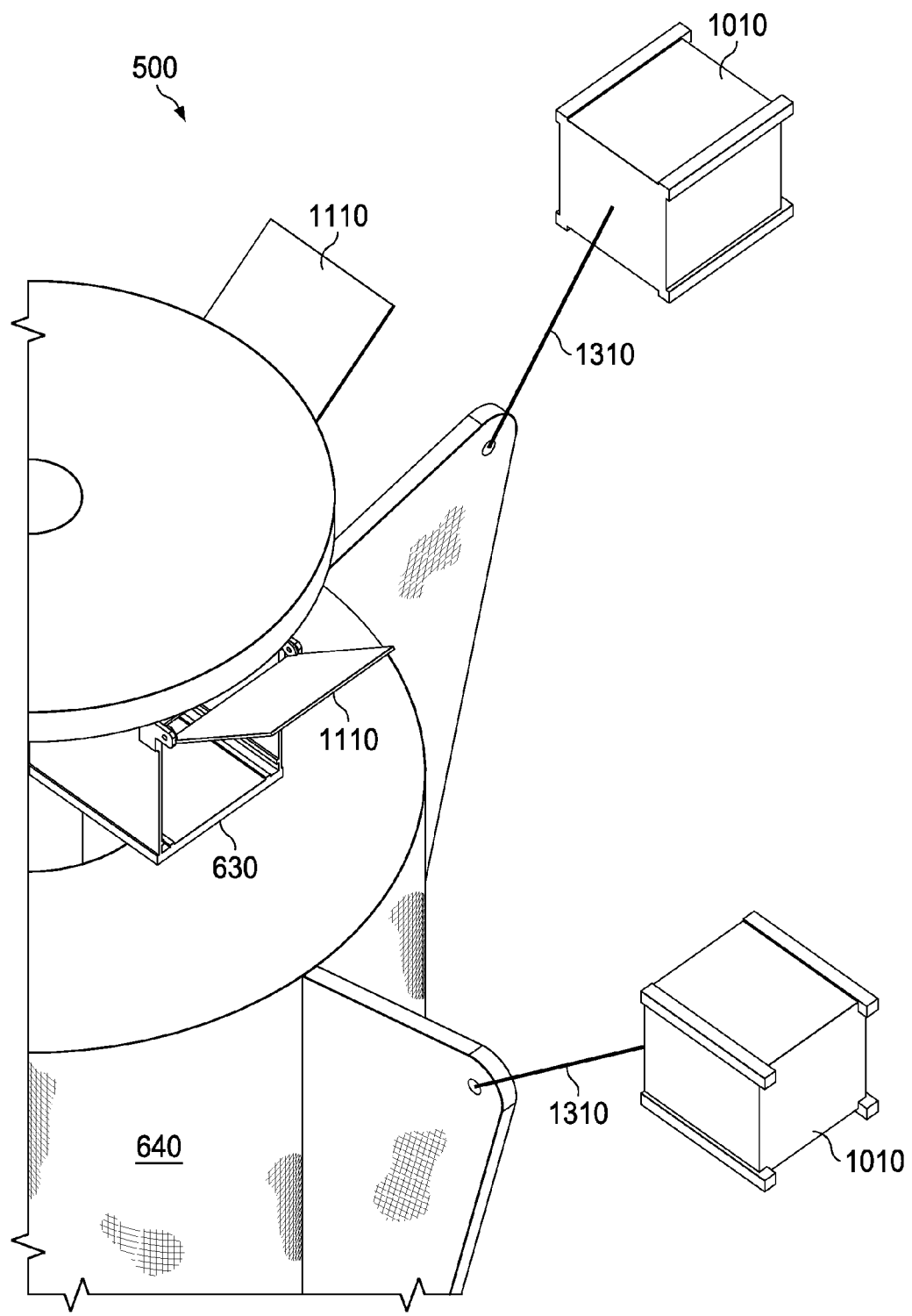
FIG. 14 is yet a further isometric view of a portion of the DRMS of FIG. 13 showing the microvehicles ejecting from their respective microvehicle housings to deploy corresponding net sections.
Figure 15:
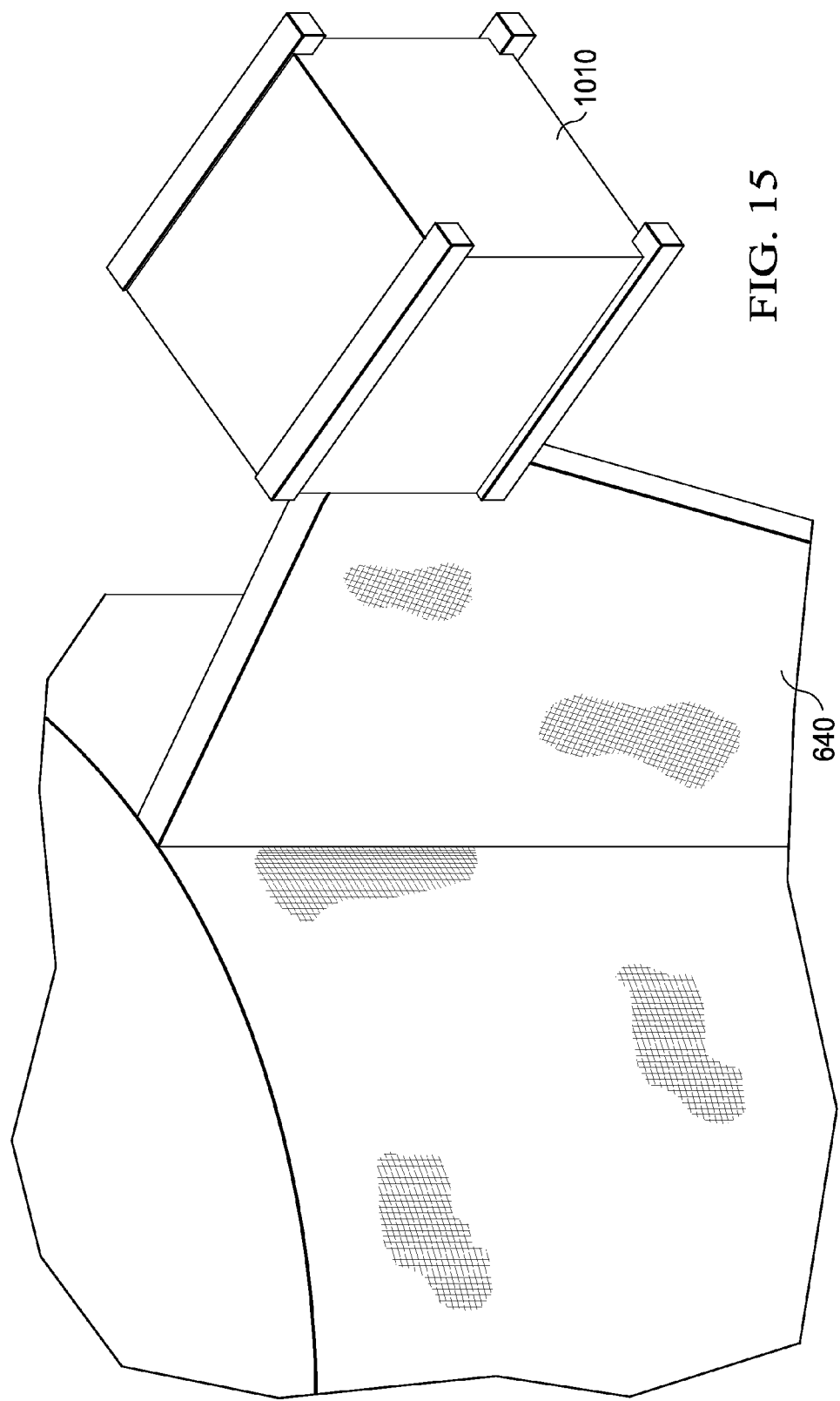
FIG. 15 is a plan view of one of the microvehicles of FIGS. 13 and 14 deploying a corresponding section of the net.

FIGS. 13-15 show various phases in net section deployment. FIG. 13 is a further isometric view of a portion of the DRMS of FIG. 5 showing the microvehicles 1010 ejecting from their respective microvehicle housings to deploy corresponding net sections. FIG. 13 is presented primarily for the purpose of illustrating tethers 1310 that couple the microvehicles 1010 to leading edges of corresponding net sections 640. FIG. 14 is yet a further isometric view of a portion of the DRMS of FIG. 13 showing the microvehicles ejecting from their respective microvehicle housings to deploy corresponding net sections 640. FIG. 15 is a plan view of one of the microvehicles 1010 of FIGS. 13 and 14 deploying a corresponding net section 640.

Figure 16:
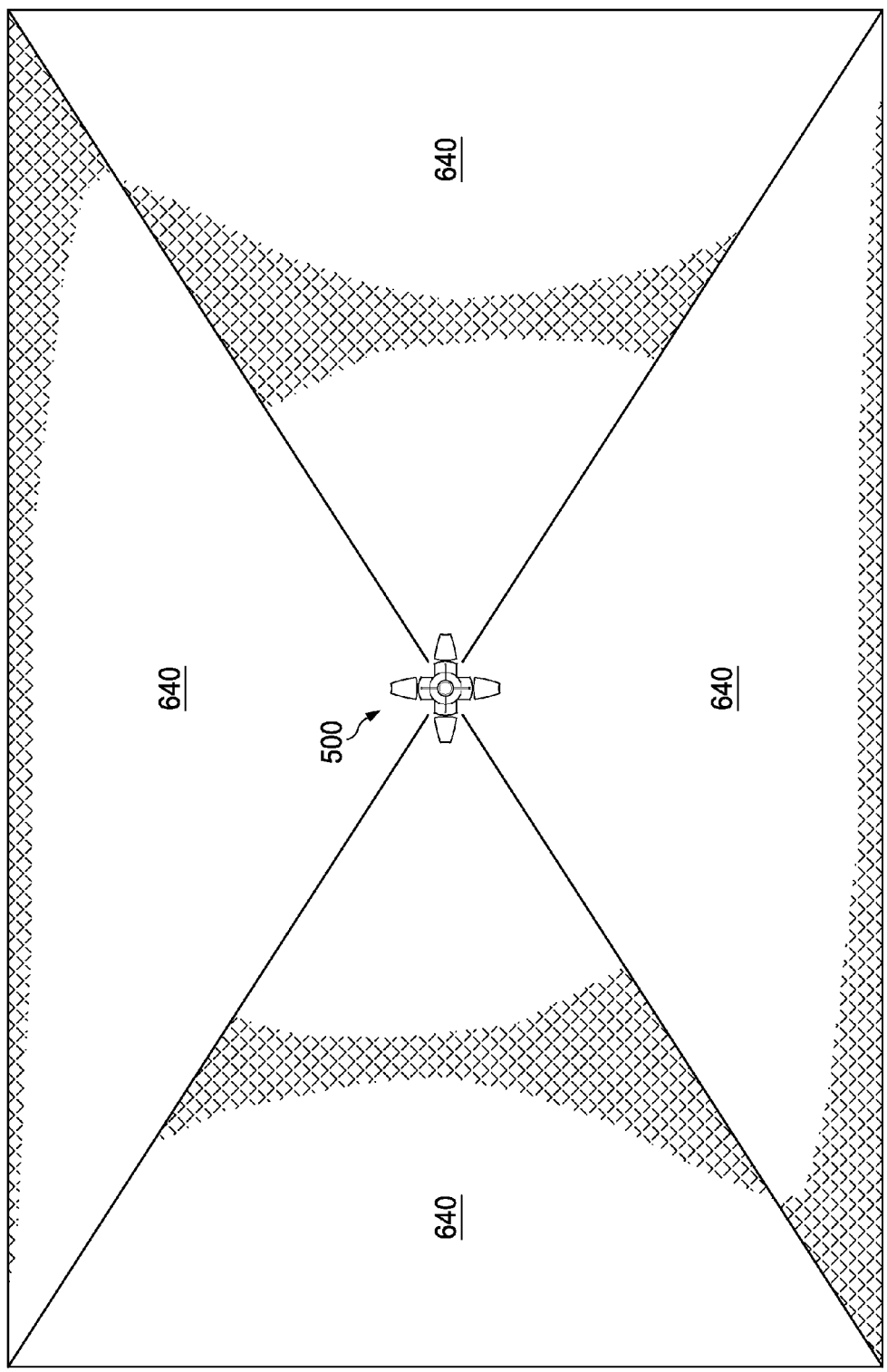
FIG. 16 is an isometric view of the DRMS of FIG. 5 showing the net thereof in a fully deployed state.

FIG. 16 is an isometric view of the DRMS of FIG. 5 showing the net thereof in a fully deployed state. FIG. 16 demonstrates that, at least in the illustrated embodiment, the overall size of the net sections 640 dwarfs the DRMS 500. The result is that a relatively large space debris collection area is presented for use.

FIG. 17 is an elevational view of the DRMS of FIG. 5 showing the net thereof in the fully deployed state. FIG. 17 is presented primarily for the purpose of showing the relationship of the net sections 640 to the DRMS 500.

FIG. 18 is a portion of the elevational view of the DRMS of FIG. 5 showing the net thereof in the fully deployed state. FIG. 18 is presented primarily for the purpose of showing that the deployed net sections 640 clear the upper and lower enclosure fairing sections 620, 730.

FIG. 19 is an elevational view of the DRMS of FIG. 18 approaching an example of a piece of space debris, namely a spent upper stage 1910 of a launch vehicle. In fact, FIG. 19 shows a Centaur, which has a nominal diameter of about 10 ft. This relatively large diameter is still small when compared to the size of the net sections of the DRMS 500. FIG. 20 is an elevational view of the DRMS 500 of FIG. 18 coming into contact with the spent upper stage 1910. At or near contact with the spent upper stage 1910, the DRMS 500 commands the microvehicles to close the net sections, perhaps by converging with each other to close the net sections and thereby retain the spent upper stage 1910. In one embodiment, the DRMS 500 then moves to a safer location. In a more specific embodiment, the DRMS 500 de-orbits and reenters the atmosphere to destroy itself and the spent upper stage 1910.

Figure 21:
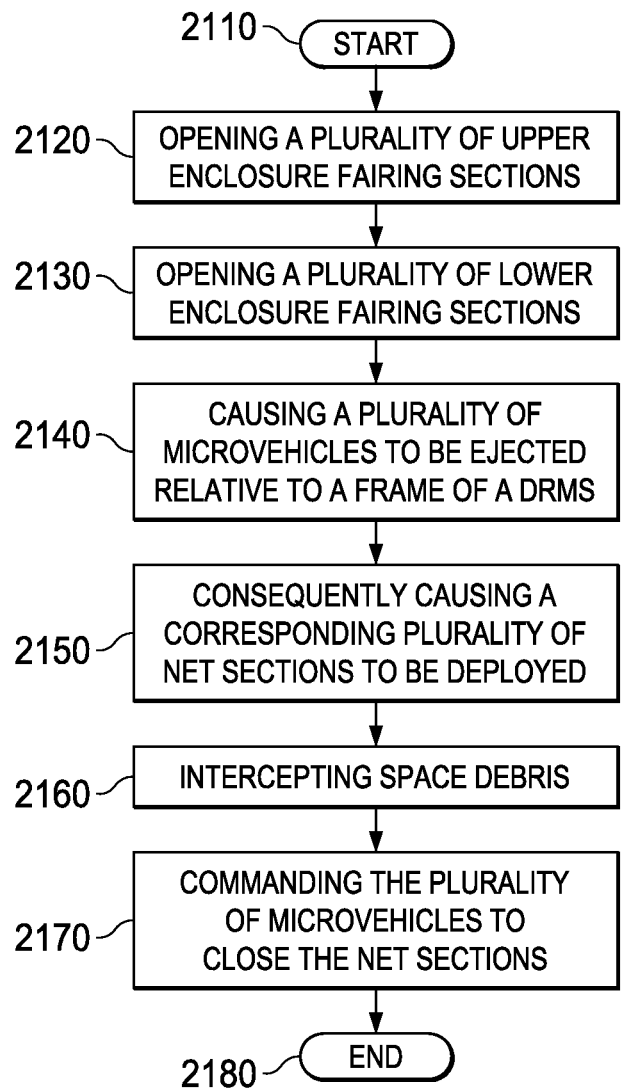
FIG. 21 is a flow diagram of one embodiment of a method of operating a DRMS carried out according to the principles of the invention.

FIG. 21 is a flow diagram of one embodiment of a method of operating a DRMS carried out according to the principles of the invention. The method begins in a start step 2110. In a step 2120, a plurality of upper enclosure fairing sections are opened. In a step 2130, a plurality of lower enclosure fairing sections are opened. In a step 2140, a plurality of microvehicles are caused to be ejected relative to a frame of a DRMS, perhaps from a corresponding plurality of microvehicle housings. In one embodiment, the microvehicles are deployed using propulsion units in the microvehicles. The plurality of microvehicles are tethered to a corresponding plurality of net sections. In a step 2150, the corresponding plurality of net sections are consequently caused to be deployed, perhaps from a generally cylindrical roll. The plurality of net sections cooperate to form a net configured to capture space debris. In a step 2160, the space debris is intercepted. In a step 2170, the plurality of microvehicles are commanded to close the net sections. The DRMS can then move to a safer location, perhaps de-orbiting and reentering the atmosphere to destroy itself and the space debris. The method ends in an end step 2180.

Those skilled in the art to which this application relates will appreciate that other and further additions, deletions, substitutions and modifications may be made to the described embodiments.

What is claimed is:

1. A debris removal management system, comprising:
a frame including a base and a support member;
a lower enclosure fairing hingedly coupled to said base and an upper enclosure fairing hingedly coupled to said lower enclosure fairing;
a plurality of net sections coupled to said frame; and
a plurality of microvehicles coupled to said plurality of net sections and configured to be ejected relative to said frame to deploy said plurality of net sections, said plurality of net sections cooperating to form a net configured to capture space debris.

2. The system as recited in claim 1 further comprising a plurality of microvehicle housings coupled to said support member and corresponding to said plurality of microvehicles.

3. The system as recited in claim 2 wherein said frame includes a cap and said plurality of microvehicle housings have doors.

4. The system as recited in claim 1 wherein said plurality of net sections are stored as a generally cylindrical roll.

5. The system as recited in claim 1 wherein said debris removal management system commands said plurality of microvehicles to be ejected relative to said frame.

6. The system as recited in claim 1 wherein said microvehicles include propulsion units configured to cause said microvehicles to be ejected relative to said frame.

7. A method of removing space debris, comprising:
opening a plurality of upper enclosure fairing sections;
opening a plurality of lower enclosure fairing sections after said opening said plurality of upper enclosure fairing sections;
causing, after said opening said plurality of lower enclosure fairing sections, a plurality of microvehicles to be ejected relative to a frame of a debris removal management system, said plurality of microvehicles being tethered to a plurality of net sections;
consequently causing said plurality of net sections to be deployed, said plurality of net sections cooperating to form a net configured to capture space debris; and
intercepting said space debris.

8. The method as recited in claim 7 wherein said causing comprises causing said plurality of microvehicles to be ejected from a corresponding plurality of microvehicle housings.

9. The method as recited in claim 8 further comprising causing said plurality of microvehicles to close said net sections.

10. The method as recited in claim 7 wherein said consequently causing comprises consequently causing said corresponding plurality of net sections to be deployed from a generally cylindrical roll.

11. The method as recited in claim 7 further comprising commanding, with said debris removal management system, said plurality of microvehicles to be ejected relative to said frame.

12. The method as recited in claim 7 further comprising employing propulsion units on said microvehicles to cause said microvehicles to be ejected relative to said frame.

13. A debris removal management system, comprising:
a frame including a base and a support member;
a plurality of net sections coupled to said frame;
a plurality of microvehicle housings coupled to said support member and having propulsion units;
a plurality of microvehicles coupled to said plurality of net sections and configured to be ejected relative to said frame to deploy said plurality of net sections using said propulsion units, said plurality of net sections cooperating to form a net configured to capture space debris; and
a lower enclosure fairing hingedly coupled to said base and an upper enclosure fairing hingedly coupled to said lower enclosure fairing.

14. The system as recited in claim 13 further comprising a plurality of microvehicle housings coupled to said support member and corresponding to said plurality of microvehicles.

15. The system as recited in claim 13 wherein said support member is coupled to a cap and said plurality of microvehicle housings have doors.

16. The system as recited in claim 15 wherein said upper enclosure fairing converges proximate said cap when closed.

17. The system as recited in claim 13 wherein said plurality of net sections are stored as a generally cylindrical roll.

18. The system as recited in claim 13 wherein said debris removal management system commands said plurality of microvehicles to be ejected relative to said frame.

* * * * *